Figure 1:
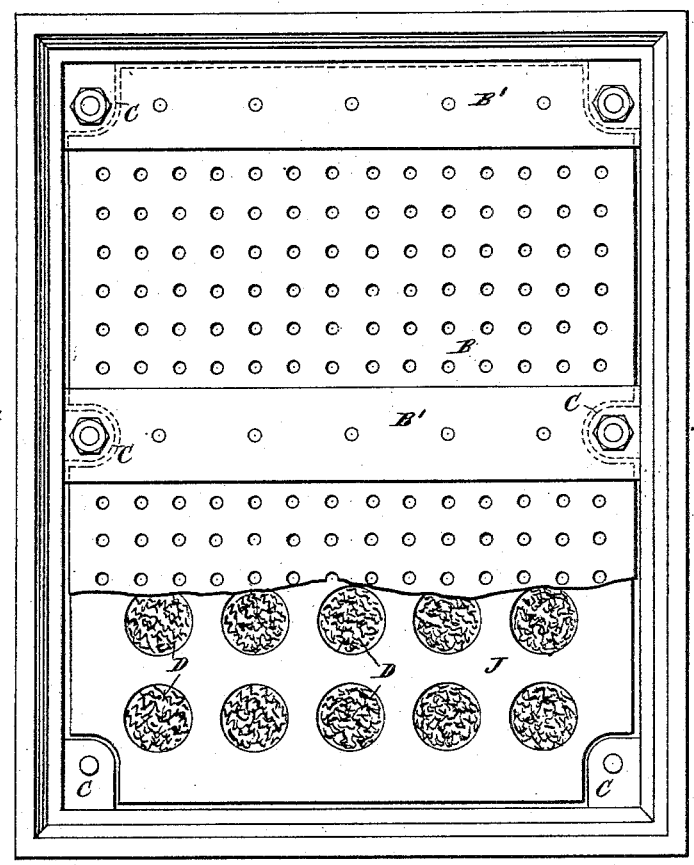

(No Model.)

W. MAIN.
PROCESS OF PREPARING ELECTRODES FOR SECONDARY BATTERIES.

No. 401,291. Patented Apr. 9, 1889.

Witnesses,
J. J. Kennedy
Geo. H. Botts

Inventor,
William Main
By his Attorneys Philipp & Philipp

UNITED STATES PATENT OFFICE.

WILLIAM MAIN, OF BROOKLYN, NEW YORK, ASSIGNOR TO THE RIVER AND RAIL ELECTRIC LIGHT COMPANY, OF WEST VIRGINIA.

PROCESS OF PREPARING ELECTRODES FOR SECONDARY BATTERIES.

SPECIFICATION forming part of Letters Patent No. 401,291, dated April 9, 1889.

Application filed January 10, 1889. Serial No. 295,960. (No model.)

*To all whom it may concern:*

Be it known that I, WILLIAM MAIN, a citizen of the United States, residing at Brooklyn, county of Kings, and State of New York, have invented certain new and useful Improvements in Storage-Batteries, fully described and represented in the following specification and the accompanying drawings, forming a part of the same.

My invention relates to secondary batteries, and in part to those formed to operate upon the general principle of the battery patented to Abraham V. Meserole March 22, 1887, No. 359,877; and it consists, in part, of an improvement upon that battery.

I have found that a horizontal form of battery, instead of an arrangement in which the plates are vertical, is in practice much better for a battery acting upon the principle of the patent referred to.

Where the plates are vertical the tendency of the zinc sulphate given off into the liquid from the plate during the process of discharge and the zinc sulphate normally in the electrolytic liquid, in case zinc salts are used therein, is to drop to the bottom of the cell and accumulate on the lower parts of the plates, in this way in time more or less disorganizing the structure of the cell and causing a liability to short-circuiting of the plates at their bases.

In the form of cell which I propose to adopt, the plates being horizontal instead of vertical, the superior gravity of the zinc in solution merely tends to throw it back upon the hydrogen pole-piece, where it properly belongs, and has no tendency toward the disorganization of the battery or the production of a short circuit.

I have also devised a special formation for the hydrogen pole-piece of this battery, which consists in the use therefor of granulated zinc lying in the bottom of the cell and supplied with a sufficient quantity of mercury to thoroughly amalgamate it. The zinc is granulated in any of the well-known ways. Thus it may be thrown while molten into water, or it may be kept in a state of agitation while cooling, which results in a finer and more uniform, and on that account preferable, granulation; or it may be finely subdivided by grinding. This form of hydrogen pole-piece I find to be specially adapted to the horizontal disposition of the plates and particularly susceptible to the equalizing tendencies of the operation of the chemical processes of the battery above referred to, and to be for these reasons a superior formation of pole-piece.

In another application, Serial No. 295,958, filed of even date herewith, I have described a battery-cell having the hydrogen pole-piece above referred to, and claim such a cell as an article. In this application I desire to describe and claim the process of forming up a hydrogen pole-piece of this character and using it in a battery-cell. In this respect my process consists in depositing upon the surface of the zinc granules from a zinc and mercury solution in the cell of the zinc and mercury sponge referred to in the before-mentioned Meserole patent. I sometimes find it desirable to mix or stir the mass after a partial deposit, as above described, so as to throw down the sponge among the zinc granules, and then, if requisite, I may further continue the sponge formation and again mix the mass until the hydrogen element contains a quantity of the aforesaid sponge distributed throughout it.

The process will not be substantially changed if the granulated zinc be amalgamated before immersion and then be placed in a mere acid bath containing no zinc or mercury in solution. The action of the current causes the formation of a zinc-mercury sponge upon the exposed surfaces of the zinc granules, and by stirring this sponge may be distributed throughout the mass and a new surface exposed to current action. Again, the electrolyte used may contain zinc in solution without mercury, mercury being present upon or in the hydrogen pole-piece. Whether or not zinc and mercury are originally present in the solution more or less of these metals may be taken up from the pole-piece and the result will be practically the same as though they were originally a part of the solution. It will be sufficient if the pole-piece contains zinc and mercury is present either in the pole-piece or in the solution.

My invention further consists in a peculiar treatment of the plates of lead or other plates used for secondary batteries before they are subjected to the forming process, and consists in this respect of giving such plates a coating of powdered plumbago, graphite, or other finely-divided carbon. This I apply to the surface of the plates by means of a brush or in any other suitable manner, spreading it evenly, so as to form a thin continuous coating upon the metallic surfaces. If necessary, the plates may be moistened, in order to cause the finely-divided carbon to adhere more perfectly; or the carbon may be moistened with water or other liquid and applied to the plates in the form of a paste. The efficiency of the carbon consists in its superior conductivity, whereby electrical action upon the plate in the process of formation is facilitated and expedited, and whereby a superior degree of conductivity in the plate after it is formed is permanently secured. I find that this process is particularly valuable when applied to the laminated form of plate heretofore invented and patented by me in Patent No. 359,934, and that when the thin plates so treated are fastened together to form a compound plate the graphite, being unattacked by the electrolytic action, is effective to maintain conductivity during and after the oxidation of the plates, by which their metallic continuity is more or less destroyed. I do not confine myself to the use of plumbago or graphite for this purpose, as any other form of finely-divided carbon, or, indeed, other material conductive of electricity but inactive in the battery—such as antimony—may be employed.

In another application of even date herewith, Serial No. 295,958, I have claimed a battery element made in accordance with this part of my invention. I herein desire to claim the process by which that element is obtained.

Figure 2:
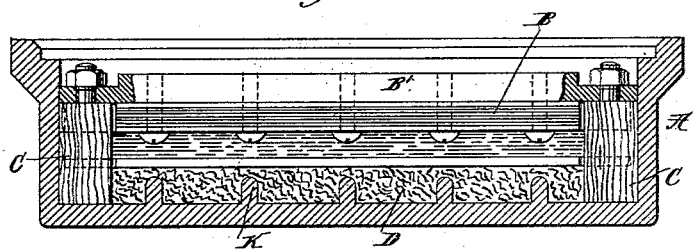

In the drawings annexed, forming part of this specification, Figure 1 is a plan view of a battery-cell embodying the present invention, and Fig. 2 is a vertical section of the same.

The structural parts of the cell shown have nothing to do with my present invention, but will be described for the purpose of clearness of illustration. The cell A is adapted to contain but two elements. The cells, however, may be constructed as desired in this respect and adapted to contain as many elements as required. The oxygen element of the cell consists of a laminated perforated plate, B, made in accordance with my aforesaid Patent No. 359,934, and supported upon cross-pieces B', which rest upon blocks C, fixed adjacent to the sides of the cell. The hydrogen pole-piece consists of granulated material D, placed in the bottom of the cell. A plate, J, having large perforations therein, and ribs K in the bottom of the cell are provided for assisting in preventing the displacement of the granulated material, as described more fully in my other application above referred to. The granulated material D is preferably zinc, and is provided with a suitable quantity of mercury. The successful action of the battery does not depend upon the use of any specified proportion of mercury to zinc. There should be enough present to amalgamate the zinc; but a very small quantity is sufficient for the purpose, and the battery will work effectually if the mercury is present in excess. I find that good results are obtained when mercury forms fifteen to twenty-five per cent., by weight, of the hydrogen pole-piece. The mercury may be added after the granulated zinc is introduced into the cell, or the zinc may be amalgamated and afterward placed in the cell.

The finely-divided zinc or other material of which the hydrogen pole-piece is composed, after being for a time subjected to the action of the current in the presence of mercury, becomes solidified into a coherent mass, having more or less self-sustaining capacity, so that it is not disorganized or changed in shape by jarring or rough usage, and thus becomes virtually integral with the bottom of the cell or the supporting tray or plate upon which it rests.

My invention consists, in part, of the process of securing a self-supporting and coherent element in this manner.

Electrical connection may be made between the hydrogen pole-piece and the binding-post of the cell by means of an insulated wire in any preferred manner—that, for instance, shown in my other application heretofore mentioned.

The laminæ from which the plate B, constituting the oxygen pole-piece of the battery, is made up, were, before being put together to form the compound plate, given a coating of plumbago, graphite, or other finely-divided carbon, for the purpose above mentioned. This coating of carbon maintains conductivity in the mass of the plate after the metallic continuity of the thin plates has been more or less destroyed. The liquid having access to many parts of the plates by reason of the perforations, and the carbon assisting conductivity from the starting-points afforded by the perforations, I secure a compact plate with very extensive surfaces fully exposed to the action of the liquid.

While I prefer carbon in some form, I do not confine myself with respect to this part of my invention to the use of that material, but may employ other substances inactive in the battery-liquid, but conductive of electricity, carbon being merely the best material now known to me for the purpose. I may also in some cases use carbon or equivalent material in sheet form instead of finely divided.

With regard to this part of my invention, the form or construction of pole-piece to which the finely-divided carbon is applied is of comparatively small importance, as is also the metal of which it is composed, the gist of the invention, broadly considered, consisting in the use of the carbon to promote and maintain conductivity throughout the metallic mass.

I do not confine myself in my broadest claims to a battery formed of a hydrogen plate of granulated material; neither need the hydrogen plate be entirely composed of zinc and mercury. Other materials may be substituted in part for the zinc of the pole-piece without special disadvantage. In fact, any conducting material which will serve as a basis for zinc and mercury deposition will furnish a foundation for a hydrogen plate when zinc and mercury salts are present in solution; or the hydrogen pole-piece may be composed in part of zinc and in part of a material comparatively more or less inactive in the battery. So, too, where zinc is used as a constituent of the hydrogen pole-piece, it is not essential to the operation of the battery that zinc should be contained in solution in the electrolyte.

Having thus described the invention, what I desire to claim and protect by Letters Patent is—

1. The process of preparing a secondary-battery pole-piece, which consists in subjecting a layer of granulated zinc to the action of an electrical current in an electrolyte and in the presence of mercury, thus causing a spongy formation of the zinc and mercury upon the granules of said layer, substantially as described.

2. The process of preparing a secondary-battery pole-piece, which consists in immersing a layer of granulated zinc in a bath containing a solution of zinc and in the presence of mercury passing an electrical current through the bath and the layer of zinc, thus forming a spongy deposit of zinc and mercury upon the granules of said layer, substantially as described.

3. The process of forming a secondary-battery pole-piece, which consists in immersing a layer of granulated zinc in a bath containing a solution of zinc and in the presence of mercury passing an electrical current through said battery and said layer of granulated zinc, thereby causing a deposit on the granules thereof of spongy mercury and zinc, and mechanically mixing said granules and said spongy deposit, substantially as set forth.

4. The process of preparing a secondary-battery pole-piece, which consists in subjecting a layer of granulated zinc to the action of an electrical current in an electrolyte in the presence of mercury, thereby procuring a spongy electrolytic formation upon the granules of said layer, and mechanically mixing said granules and said spongy formation, substantially as described.

5. The process of forming up a compound plate for a secondary battery, which consists in coating one or more laminæ with carbon or equivalent material conductive of electricity and inactive in the battery, uniting the laminæ together, and subjecting the compound plate thus formed to the action of a current until the metal of the laminæ becomes wholly or partially oxidized, substantially as described.

6. The process of forming up a compound plate for a secondary battery, which consists in covering the laminæ of the plates with finely-divided carbon, uniting the laminæ together, and subjecting the compound plate that is thus formed to the action of a current until the metal of the laminæ becomes wholly or partially oxidized, substantially as described.

7. The process of forming up a compound plate for a secondary battery, which consists in covering the laminæ of the plates with finely-divided graphite, uniting the laminæ together, and subjecting the compound plate that is thus formed to the action of a current until the metal of the laminæ becomes wholly or partially oxidized, substantially as described.

8. The process of forming a secondary-battery plate, which consists in placing finely-divided material upon a proper support and subjecting it to the action of a current in an electrolytic bath in the presence of mercury until it becomes solidified into a coherent mass, substantially as described.

9. The process of forming a secondary-battery plate, which consists in placing finely-divided zinc upon a proper support and subjecting it to the action of a current in an electrolytic bath in the presence of mercury until it becomes solidified into a coherent mass, substantially as described.

In testimony whereof I have hereunto set my hand in the presence of two subscribing witnesses.

WILLIAM MAIN.

Witnesses:
D. PETRI-PALMEDO,
J. J. KENNEDY.